(12) United States Patent
Jafarzadeh et al.

(10) Patent No.: US 12,416,545 B2
(45) Date of Patent: Sep. 16, 2025

(54) SYSTEMS AND METHODS FOR MONITORING DRIVE UNIT BEARINGS

(71) Applicant: GM GLOBAL TECHNOLOGY OPERATIONS LLC, Detroit, MI (US)

(72) Inventors: Ehsan Jafarzadeh, Toronto (CA); Hossein Sadjadi, Thornhill (CA); Paola Scarassatti Sant Anna, Lake Orion, MI (US); Dezhi Li, Toronto (CA); Sara Sadat Rahimifard, Richmond Hill (CA); Yu Cao, Courtice (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 309 days.

(21) Appl. No.: 18/331,447

(22) Filed: Jun. 8, 2023

(65) Prior Publication Data
US 2024/0410786 A1 Dec. 12, 2024

(51) Int. Cl.
*G01M 13/045* (2019.01)
*F16C 19/52* (2006.01)

(52) U.S. Cl.
CPC ......... *G01M 13/045* (2013.01); *F16C 19/527* (2013.01); *F16C 2233/00* (2013.01)

(58) Field of Classification Search
CPC .. G01M 13/045; F16C 19/527; F16C 2233/00
See application file for complete search history.

(56) References Cited

FOREIGN PATENT DOCUMENTS

WO    WO-2004027370 A1 *   4/2004   ............. F16C 19/52

\* cited by examiner

*Primary Examiner* — Jamel E Williams
(74) *Attorney, Agent, or Firm* — Ingrassia Fisher & Lorenz, LLP | IF&L

(57) ABSTRACT

Vehicles and systems and methods for health monitoring drive unit bearings in vehicles are provided. A system for health monitoring a drive unit bearing in a vehicle includes a sensor mounted to a drive unit of the vehicle and configured to provide a vibration signal; and a processor configured to: pre-process the vibration signal from the sensor to enhance a fault signature and form a frequency domain signal; and process the frequency domain signal to estimate a health stage of the drive unit bearing.

20 Claims, 4 Drawing Sheets

SYSTEMS AND METHODS FOR MONITORING DRIVE UNIT BEARINGS

INTRODUCTION

The present disclosure relates to monitoring drive unit bearings. More specifically, the present disclosure relates to health monitoring drive unit bearings using vibration sensors.

Bearings such as those utilized in drive units for motor vehicles may experience faults when in use. For example, drive unit bearing may fail due to fatigue (spalling) at high milage, or electrical damage (fluting) in electric vehicles, among other reasons.

Accordingly, it is desirable to provide methods and systems for determining drive unit bearing health. Furthermore, other desirable features and characteristics of the present disclosure will become apparent from the subsequent detailed description and the appended claims, taken in conjunction with the accompanying drawings and the foregoing introduction.

SUMMARY

A system for health monitoring a drive unit bearing in a vehicle is provided and includes a sensor mounted to a drive unit of the vehicle and configured to provide a vibration signal; and a processor configured to: pre-process the vibration signal from the sensor to enhance a fault signature and form a frequency domain signal; and process the frequency domain signal to estimate a health stage of the drive unit bearing.

In some embodiments of the system, the processor is configured to process the frequency domain signal to extract and fuse health indicators, and to estimate a fault level and a fault location from the health indicators.

In some embodiments of the system, the processor is configured to process the frequency domain signal to detect whether a bearing is healthy or faulty.

In some embodiments of the system, the processor is configured to process the frequency domain signal to isolate a fault in a particular bearing and to determine the location of the fault on the particular bearing.

In some embodiments of the system, the processor is configured to pre-process the vibration signal from the sensor by performing a phase domain transformation, a discrete frequency removal, an impulsiveness enhancement, an envelope filter, and a short time Fourier transformation (STFT).

In some embodiments of the system, the processor is configured to process the frequency domain signal by calculating health indicators; applying a regression model to the health indicators to find health stages; and comparing the health stages with predefined thresholds to detect a state of health of the drive unit bearing.

In some embodiments of the system, the processor is configured to perform a calibration process including fitting a regression model to health indicators to find health stages; calculating a modeling error; ranking the health stages; selecting specific health stages to fuse; and determining pre-defined weights for the health stages, and wherein outputs from the calibration process are stored in the system.

In some embodiments of the system, the processor is configured to: calculate health indicators; apply a pre-defined model to estimate fault level (health stage) from health indicators, apply the pre-defined weights to generate weighted health stages; sum the weighted health stages to provide a fused health stage; and compare the fused health stage with a predefined threshold to detect a state of health of the drive unit bearing.

In some embodiments of the system, the processor is further configured to communicate an output indicating the health stage of the drive unit bearing.

In some embodiments, the system further includes a motor speed sensor for sensing motor speed and/or a torque sensor for sensing torque, and the processor is configured to determine whether the motor speed is in a speed range and/or to determine whether the torque is in a torque range suitable for monitoring the drive unit bearing.

A method for monitoring health of a drive unit bearing in a vehicle is provided and includes sensing vibrations with a sensor at a known location relative to a drive unit and providing sensor data; performing a short time Fourier transform (STFT) to form spectrum signals over a plurality of segments; calculating health indicators of the drive unit bearing based on the spectrum signals and on critical frequencies of the drive unit bearing; and determining a health stage of the drive unit bearing based on each health indicator.

In some embodiments of the method, determining the health stage of the drive unit bearing based on each health indicator includes applying a regression model to each of the health indicators.

In some embodiments, the method further includes detecting a state of health of the drive unit bearing based on the health stages.

In some embodiments, the method further includes performing a calibration process including fitting a regression model to health indicators to find health stages; calculating a modeling error; ranking the health stages; selecting specific health stages to fuse; determining pre-defined weights for the health stages; and storing outputs from the calibration process.

In some embodiments, the method further includes applying the pre-defined weights to the calculated health indicators to generate weighted health stages.

In some embodiments, the method further includes calculating a fused health stage from the weighted health stages.

In some embodiments, the method further includes comparing the fused health stage with a predefined threshold to detect a state of health of the drive unit bearing.

In some embodiments, the method further includes communicating an output indicating the health stage of the drive unit bearing.

In some embodiments of the method, the drive unit bearing is a first drive unit bearing, and the method further includes monitoring health of a second drive unit bearing.

A vehicle is provided and includes a drive unit bearing; a vibration sensor configured to provide sensor data; and a processor or processors individually or collectively configured to: pre-process the sensor data to generate a spectrum; and process the spectrum to estimate health stages of the drive unit bearing.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In embodiments herein, a method and system capable of early detection and isolation of degraded drive unit bearings uses health indicators extracted from bearing critical frequencies in the vibration spectrum. Thus, propulsion loss and potential safety concerns associated with drive unit bearing failure may be avoided. Embodiments herein are provided for electric vehicles (EV), autonomous vehicles (AV), internal combustion vehicles, hybrid vehicles, or other suitable vehicles.

Figure 1:
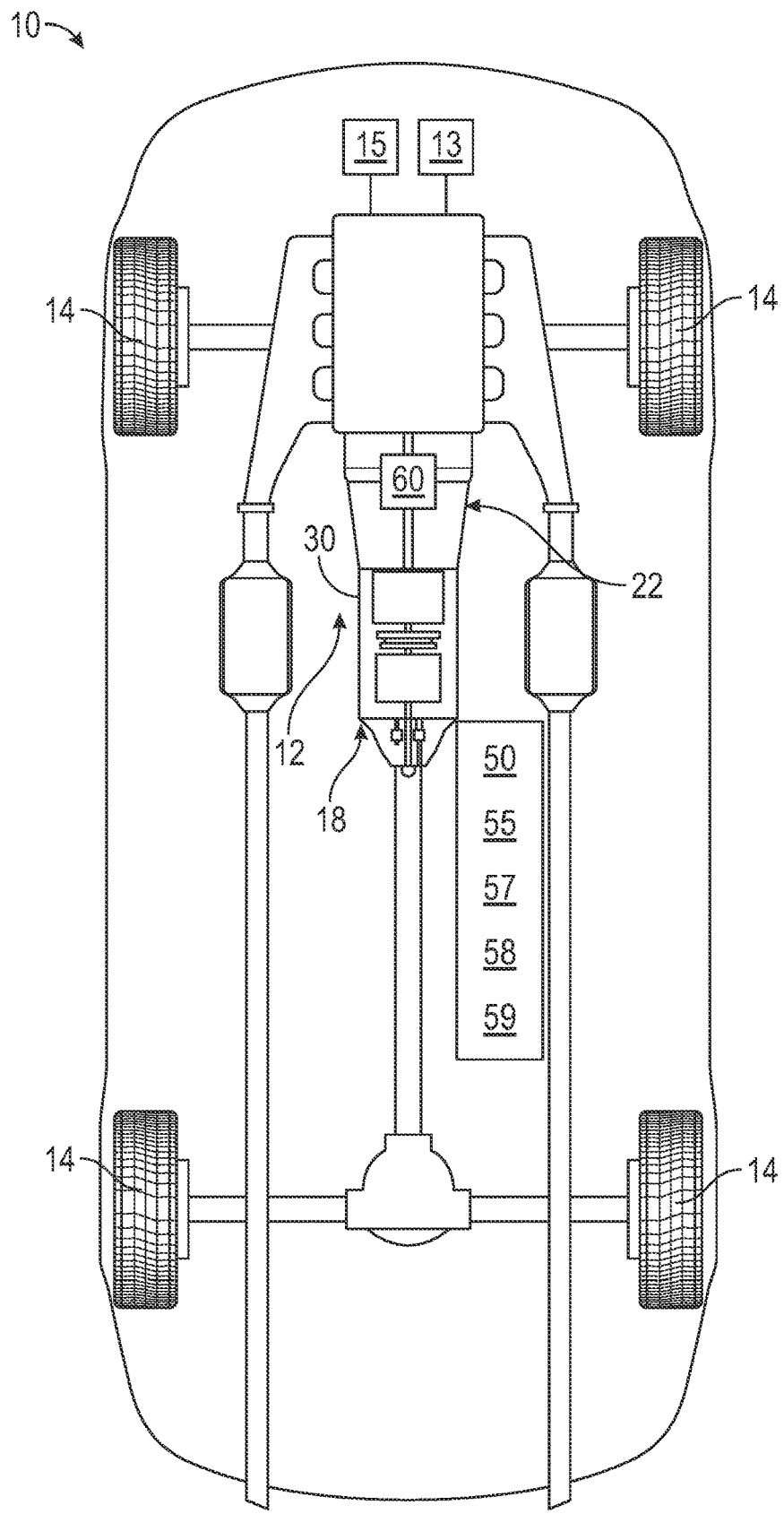
FIG. 1 is a schematic illustration of a vehicle according to an exemplary embodiment.

Referring to the drawings, wherein like reference numbers refer to like components, FIG. 1 illustrates a vehicle 10.

The vehicle 10 includes a powertrain 12 configured to launch and propel the vehicle, i.e., to operate the vehicle in all speed ranges between low and high road speeds via drive wheels 14. The exemplary powertrain 12 includes an engine or motor 18. For example, the vehicle may be an electric vehicle (EV), an internal combustion engine (ICE) vehicle, or a hybrid vehicle. The powertrain 12 is operatively connected to an electro-mechanical drive unit 22.

The drive unit 22 also includes a drive unit casing 30 that functions as a stationary member to which the motor 18 and other certain torque transmitting devices (not shown) may be grounded.

In FIG. 1, the vehicle 10 is provided with a motor speed sensor 13, a torque sensor 15, and an accelerometer/vibration sensor 60. Further, the vehicle 10 includes a system 55 for monitoring drive unit bearings. In some embodiments, the system 55 is coupled to the drive unit 22 as described below. System 55 may include or be in communication with the motor speed sensor 13, the torque sensor 15, and the accelerometer sensor 60. Further, system 55 includes a controller 50, which may communicate with the motor speed sensor 13, torque sensor 15, and accelerometer sensor 60. In certain embodiments, the controller 50 may be part of a larger system processor.

Figure 2:
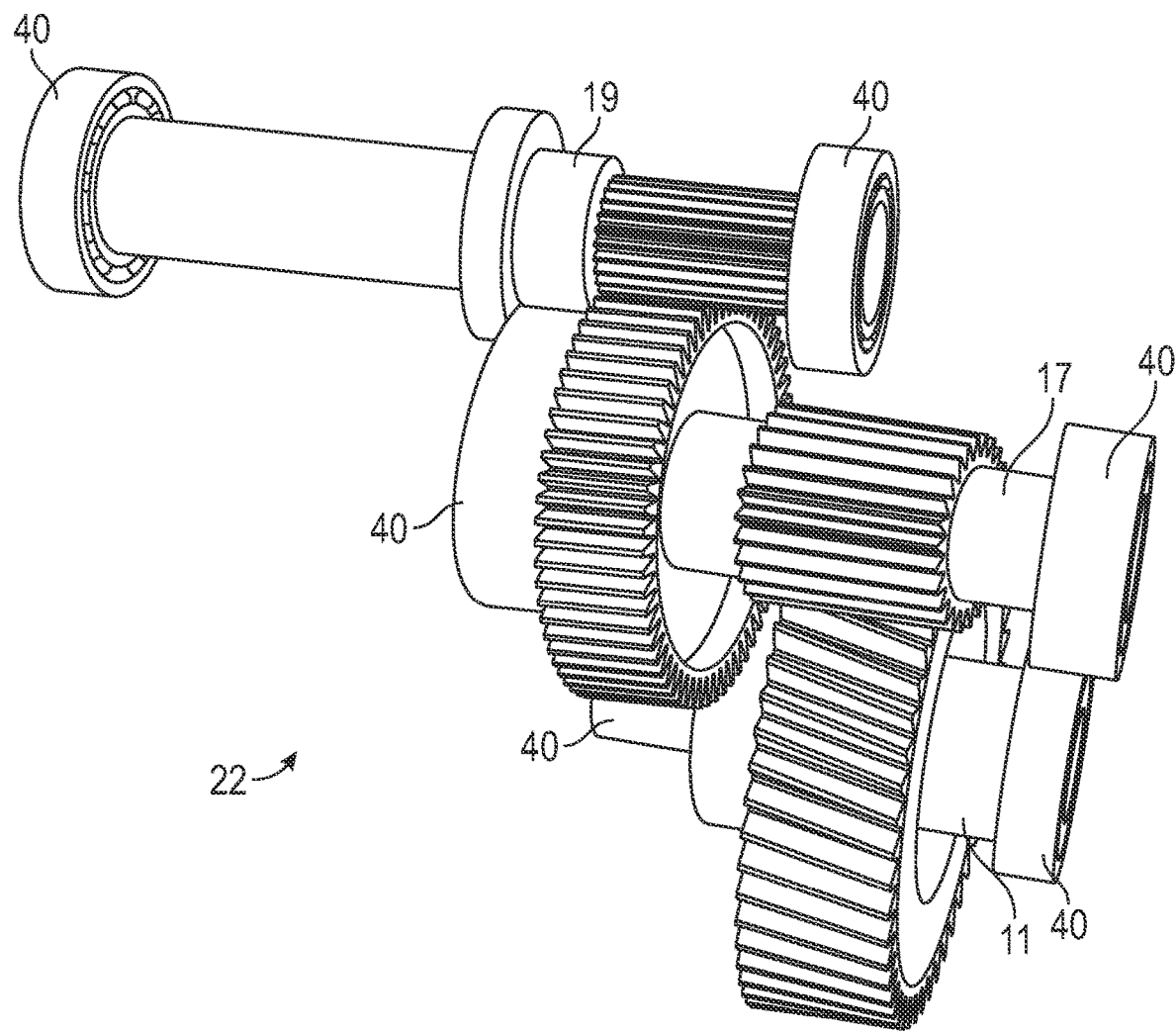
FIG. 2 is a perspective view of a portion of the drive unit depicted in FIG. 1, illustrating the location of some drive unit bearings, according to an exemplary embodiment.

It is noted that the system 55 may be provided for health monitoring of the mechanical components of the drive unit for an EV or gearbox for an ICE vehicle or for components of a hybrid vehicle. FIG. 2 illustrates an exemplary drive unit for an EV. As shown in FIG. 2, the drive unit 22 includes a plurality of bearings 40. For example, a respective bearing 40 may be on an input shaft 19, on transfer shaft 17, and/or on output shaft 11. Bearings 40 may include ball bearings, cylindrical roller bearings, tapered ball bearings, or other suitable bearings.

Figure 3:
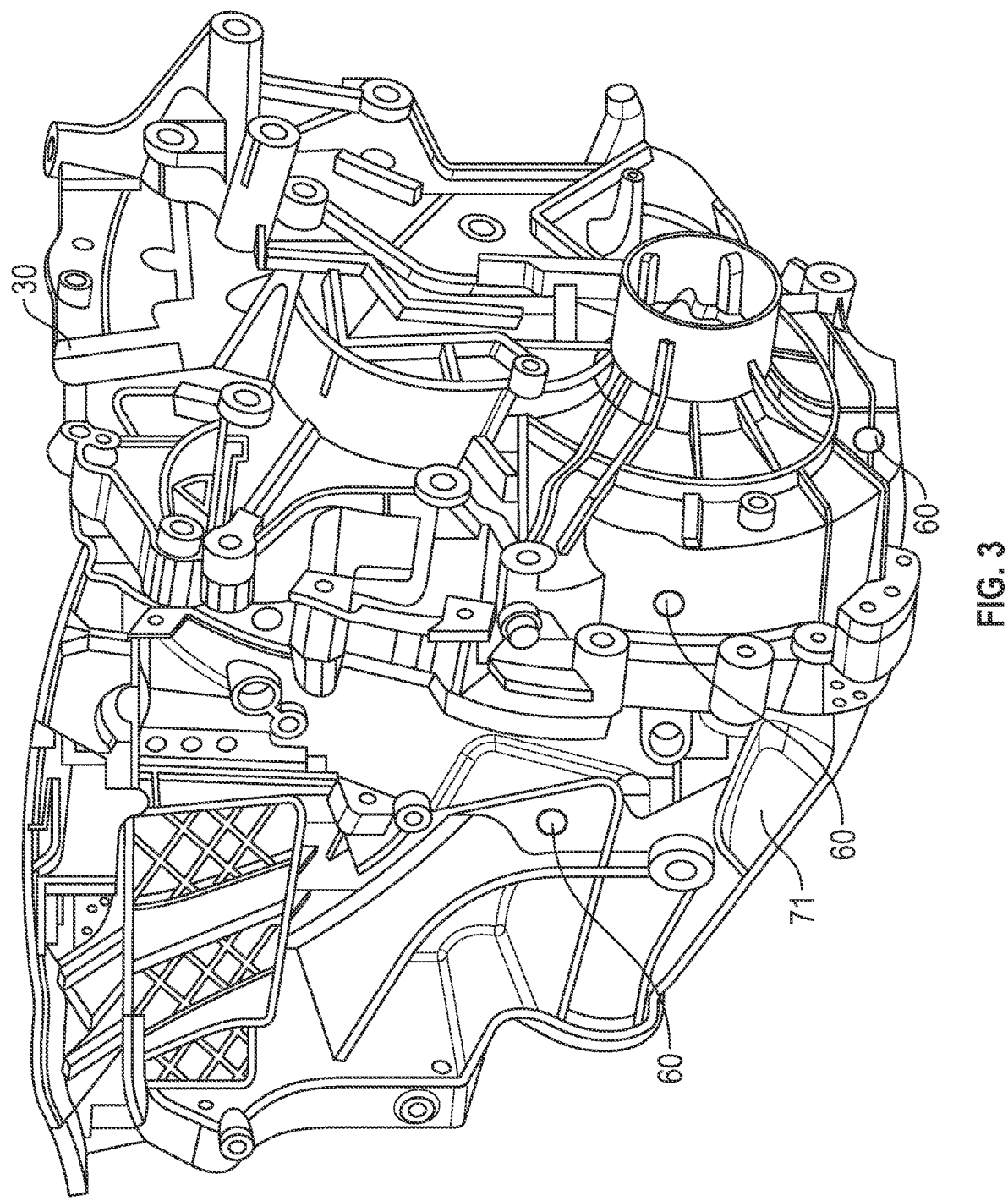
FIG. 3 is a perspective view of a drive unit casing for enclosing the drive unit of FIGS. 1 and 2 and illustrating the location of some vibration sensors, according to an exemplary embodiment.

FIG. 3 illustrates a casing 30 for enclosing the drive unit 22 shown in FIG. 2. As shown in FIG. 3, vibration sensors 60 are mounted to the external surface 71 of the drive unit casing 30. Each vibration sensor 60 may be dedicated for analysis of a specific bearing 40 inside the drive unit casing 30. In other embodiments, more than one vibration sensor 60 may be used to analyze one bearing 40. In other embodiments, one vibration sensor 60 may be used to analyze more than one bearing 40. While FIG. 3 illustrates vibration sensors 60 being mounted on the external surface 71 of the drive unit casing 30, in other embodiments some or all vibration sensors 60 may be located within the drive unit casing 30. In either case, each vibration sensor 60 is located at a known location, with a known distance from a bearing or bearings 40 and known orientation relative to a bearing or bearings 40.

In FIG. 1, the system 55 may include, or receives instructions from, controller 50. The term "controller" and related terms, such as electronic control unit or engine control unit (ECU), may include or refer to one or various combinations of Application Specific Integrated Circuit(s) (ASIC), electronic circuit(s), central processing unit(s), for example, microprocessor(s) and associated non-transitory memory component(s) in the form of memory and storage devices (read only, programmable read only, random access, hard drive, etc.).

The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals. Alternatively, routines may be executed in response to occurrence of a triggering event. Communication between the controller 50, the sensors 13, 15, 60 and the system 55 is accomplished in various arrangements using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

It is noted that data from the vibration sensors may be processed either on-board (on the vehicle) or off-board. For on-board, the ECU may serve as the controller 50. For off-board, the data can be sent to back office controller 50, and processing can be done offline. Further, the method for monitoring a bearing 40 can be live health monitoring or off-line health monitoring.

As illustrated in FIG. 1, the controller 50 may accept information from various sources, process that information, and provide control commands based thereon to effect outcomes such as operation of the vehicle 10 and its systems, including of the system 55. In the depicted embodiment, the controller 50 includes a processor 57 and a memory device 58, and is coupled with a storage device 59. The processor 57 performs the computation and control functions of the controller 50, and may be any type of processor or multiple processors, single integrated circuits such as a microprocessor, or any suitable number of integrated circuit devices and/or circuit boards working in cooperation to accomplish the functions of a processing unit. During operation, the processor 57 may execute one or more programs and may use data, each of which may be contained within the storage device 59 and as such, the processor 57 controls the general operation of the controller 50 in executing the processes described herein, such as the processes and methods described in greater detail below.

The memory device 58 may be any type of suitable memory. For example, the memory device 58 may include volatile and nonvolatile storage in read-only memory (ROM), random-access memory (RAM), and keep-alive memory (KAM), for example. KAM is a persistent or non-volatile memory that may be used to store various operating variables while the processor 57 is powered down. The memory device 58 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 50. In the depicted embodiment, the memory device 58 may store the above-referenced programs along with one or more stored values of the data such as for short-term data access.

The storage device 59 stores data, such as for long-term data access for use in automatically controlling the vehicle 10 and its systems. The storage device 59 may be any suitable type of storage apparatus, including direct access storage devices such as hard disk drives, flash systems, floppy disk drives and optical disk drives. The storage device 59 is a non-transitory computer readable medium configured to store programs and data, such as on parameters of the vehicle 10. In one exemplary embodiment, the storage device 59 is a source from which the memory device 58 receives the programs that execute one or more embodiments of one or more processes of the present disclosure. In another exemplary embodiment, the programs may be directly stored in and/or otherwise accessed by the memory device 58. The programs represent executable instructions, used by the controller 50 in processing information and in controlling the vehicle 10 and its systems, including the system 55.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 57) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 50 may also otherwise differ from the embodiment depicted in FIG. 1.

In some embodiments, the controller 50 operates system 55 to perform a method for monitoring bearings 40, and specifically for detecting bearing degradation, for isolating degraded bearings, and/or for locating bearing faults in the drive unit of a vehicle.

Figure 4:
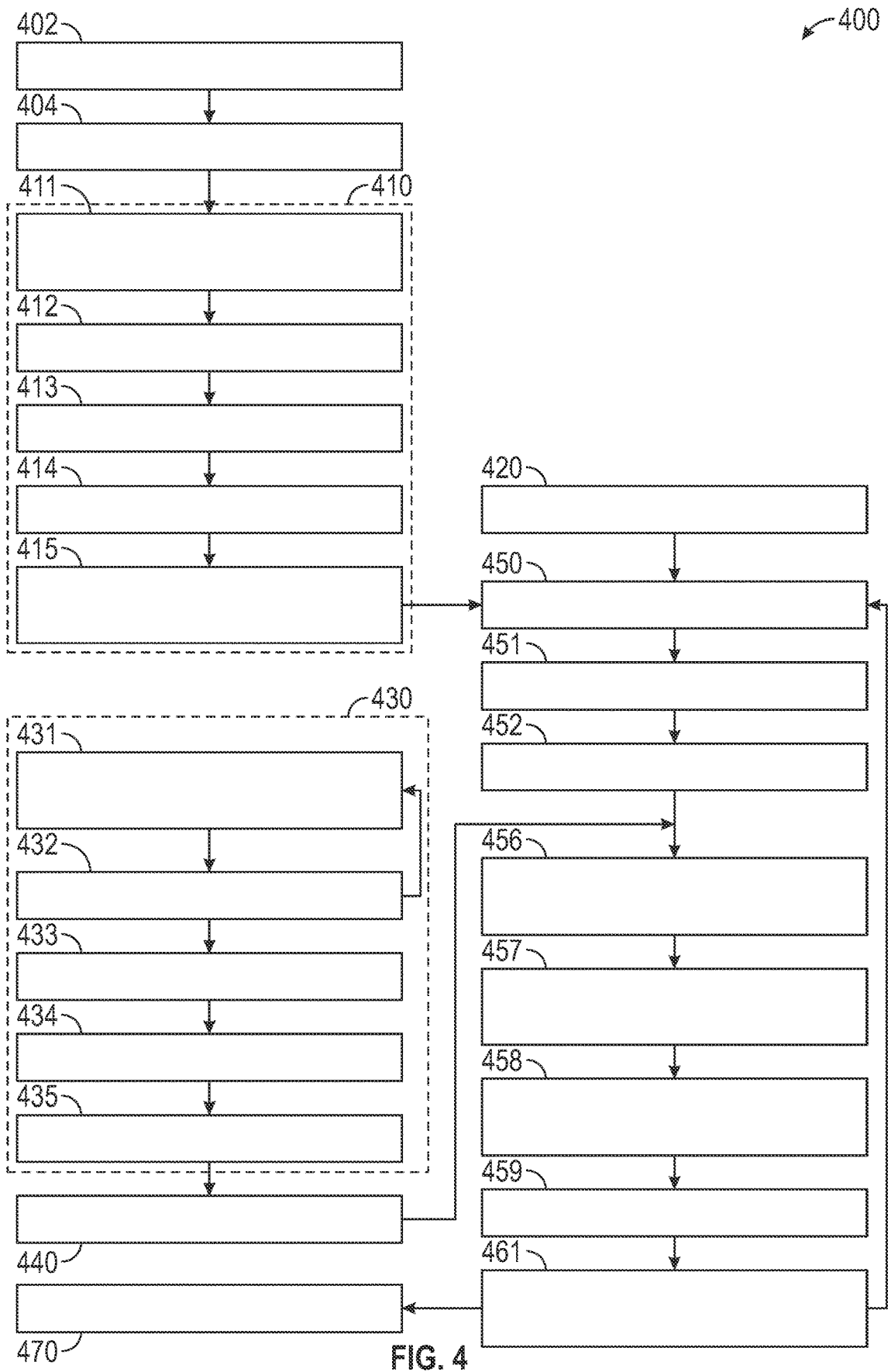
FIG. 4 is a flow chart of a method for monitoring drive unit bearings in a motor vehicle, according to an exemplary embodiment.

Referring to FIG. 4, a flow chart of a method 400 for monitoring a bearing 40 in a drive unit 22 for a motor vehicle 10 is illustrated. The method 400 may include isolating the fault, i.e., isolating the defective bearing amongst a plurality of drive unit bearings, and identifying the location of the fault within the faulted bearing.

In various implementations, method 400 includes, at action 402, receiving vehicle signals. The vehicle signals may include vibration, motor torque, and speed signals, such as from sensors 60, 15, and 13, and/or other signals. For example, the system 55 or controller 50 may receive the vehicle signals.

At action 404, the method 400 includes triggering the algorithm for processing vibration signals to monitor drive unit bearing health. In one non-limiting example, the algorithm may be triggered when the motor speed is in a selected range and/or when the torque speed is in a selected range.

After the algorithm is triggered at action 404, method 400 proceeds with pre-processing the vibration signal at pre-processing block 410.

For example, at action block 411, method 400 transforms the vibration signal from a time-based signal to a phase-based signal. More specifically, the method 400 uses the motor speed signals to transform the vibration signals captured from the vibration sensor 60 into the phase domain. For example, the method 400 may use a pulse count component of the motor speed signal from an encoder in the motor speed sensor 13 or may integrate the angular velocity values. Transforming the vibration signal from a time-based signal to a phase-based signal removes speed variation from the signal.

At action block 412, method 400 filters other vibrations from the signal. For example, a discrete frequency removal process removes vibrations generated from other components, such as other vehicle components, other drive unit components including gears, and/or may remove road noise. The discrete frequency removal process includes any suitable technique to remove unwanted vibration or interference by identifying and filtering out specific frequencies. For example, the discrete frequency removal process may use autoregressive linear prediction, self-adaptive noise cancellation, random/discrete separation and/or time synchronous averaging (TSA) techniques.

Autoregressive linear prediction (ARLP) uses a mathematical model to predict future values of a signal based on a linear combination of past values. ARLP can be used to estimate the coefficients of a filter that can be used to remove a specific frequency from a signal. Specifically, the filter is designed based on the past values of the signal, which are used to estimate the coefficients of the filter. The filter is then applied to the signal to remove the unwanted frequency component.

Self-adaptive noise cancellation (SAN) is based on the concept of adaptive filtering, where a filter is designed to remove noise from a signal based on the characteristics of the noise itself. In SAN, the filter is adjusted in real-time based on the incoming signal, allowing it to adapt to changing noise conditions.

Random/discrete separation techniques involve separating the signal into discrete components and then selectively removing the components that contain unwanted noise. This can be achieved through techniques such as Fourier analysis, which breaks down a signal into its individual frequency components. Once the individual components have been identified, the unwanted frequencies can be removed, leaving behind a cleaner signal, i.e., a signal with a high signal to noise ratio.

As shown in FIG. 4, method 400 further includes, at action block 413, enhancing the fault signature, i.e., enhancing signal impulsiveness. Specifically, method 400 may enhance impulsive events or transients in the signal. Vibrations from the fault are impulsive. so, enhancing signal impulsiveness will enhance the fault signature. Further, action block 413 may remove road noise from the signal.

Thus, to further enhance the impulsiveness in the signal, an impulsiveness enhancement process, such as bandpass filtering, is performed to selectively enhance the impulsive events in the signal, such as based on a desired frequency range. Bandpass filtering is a technique that is used to filter out unwanted frequency components from a signal while preserving the desired frequency range of the impulsive events in the signal. The desired frequency range, i.e., the selection criterion, is a frequency range in which the impulsiveness is maximum using spectral kurtosis.

Additionally or alternatively, impulsiveness in the signal may be enhanced by using a technique such as minimum entropy deconvolution (MED). Minimum entropy deconvolution is a technique that is used to recover the impulsive events in the signal. The technique works by minimizing the entropy of the recovered impulse response, which results in a deconvolved signal that is enhanced in its impulsive content.

In FIG. 4, method 400 may continue at action block 414 with applying an envelope. For example, method 400 may use an envelope filter process that isolates the envelope or amplitude variations of the signal while attenuating its high frequency content. In some embodiments, the envelope filter process isolates a transient component of the signal, i.e., a sudden and brief change in amplitude, such as a spike or pulse. The envelope filter may act as a low-pass filter to pass only the low-frequency components of the signal, which correspond to the envelope. The result is a signal that contains only the low-frequency components of the input, which represent its envelope.

Method 400 further includes, at action block 415, performing a short time Fourier transform (STFT). For example, the method 400 may analyze the signal by breaking the signal into small overlapping segments, applying a window (such as hanning or hamming) on the small segments to reduce the frequency domain artifacts, and performing a Fourier transform or fast Fourier transform (FFT) on each windowed segment to obtain its frequency content. As a result, the STFT process transforms the signal from the phase domain to the frequency domain to form a spectrum signal for each short segment.

In summary, method 400 uses predefined enabling criteria together with vehicle signals (including, but not limited to, motor torque and speed signals) to determine whether to trigger the algorithm. Further, motor speed signals are used to transform the vibration signals captured from the vibration sensor from the time domain to the phase domain. Thereafter, a discrete frequency removal approach (e.g., Autoregressive Linear Prediction or Self Adaptive Noise Cancellation or Random/Discrete Separation) is applied on the vibration signals in the phase domain to filter the vibrations of other drive unit and vehicle components including, but not limited to, the shafts and gears. Then, signal impulsiveness is enhanced using minimum entropy deconvolution or bandpass filtering based on the spectral kurtosis to remove noise and to magnify any potential fault signature. Next, an envelope filter is applied on the signals with enhanced impulsiveness to enhance the fault signature. After enhancing the fault signature, the signals are divided into small windows or buffers, a window function is applied on each window and a short time Fourier transform is taken for each window to generate a vibration spectrum.

As a result of action blocks 411-415 in the pre-processing block 410, a vibration spectrum is generated at action block 415 from the vibration signal received at action block 402 from the vibration sensor.

Method 400 may include, at action block 420, storing critical frequencies of the bearings. Specifically, for each bearing and location thereon, critical frequencies including Ball Pass Frequency Inner race (BPFI), Ball Pass Frequency Outer race (BPFO) and Ball Spin Frequency (BSF) are calculated from the bearing's known geometry. This one-time calculation of critical frequencies is then stored in a memory in or accessible by the system 55, such as in controller 50 or in a memory accessible by the controller 50.

At action block 450, method 400 selects a bearing for analysis.

At action block 451, method 400 selects a location on the selected bearing, e.g., inner race, outer race, etc., for analysis.

At action block 452, method 400 calculated Health Indicators for the selected bearing location based on the spectrum and on the stored critical frequencies. In some embodiments, the Health Indicators include the amplitude of the Fast Fourier Transform (FFT) at critical frequencies, the relative value of FFT at critical frequencies, the peak height in a small window centered at the critical frequencies, the normalized peak height in a small window centered at the critical frequencies, the absolute value of energy in a small window centered at the critical frequencies, the relative value of energy in a small window centered at the critical frequencies, the sidebands of the critical frequencies, the relative sidebands of the critical frequencies, or various combinations thereof. The Health Indicators may be calculated through one or more techniques. In certain embodiments, the Health Indicators may be calculated from the spectrum of each window based on the critical frequencies. The Health Indicators may be determined for each segment, i.e., window or buffer.

In some embodiments, the health indicator module includes normalization. For example, while larger vibration (due to larger torque or at higher speed) yields larger FFT amplitude, the larger FFT amplitude does not indicate that the fault level is larger. The health indicators (absolute FFT, peak, sideband) may be divided by the root mean square (RMS) of the segments in the phase domain. Alternatively, the health indicators are divided by the median of FFT amplitudes of a window (in the frequency domain) centered at the critical frequencies.

Additionally or alternatively, the health indicator module 87 may perform relative energy normalization, which includes dividing the amplitude values in each frequency band by the total energy in that band. This has the effect of removing variations in amplitude due to changes in operating conditions or measurement equipment.

As shown in FIG. 4, method 400 may include a calibration process 430 to be performed one time. At action block 431, the calibration process 430 includes fitting a regression model to health indicators (HI) vs. actual degradation levels (ground truth of the degradation level). In exemplary embodiments, this is performed using all windows. This calibration step determines a model for each health indicator (HI) in this manner. Specifically, action block 431 will be repeated for all health indicators (HI), as one model per health indicator is required. In other words, passing HIs (all windows) to the model is repeated for all HIs (i.e., relative peak HI, energy HI, etc.). For each health indicator, the values of the health indicator (all windows) is input, and the estimated degradation level is output. The estimated degradation level is referred to as the Health Stage (HS). The Health Stage may be an estimate of the bearing ground-truth state of health.

Further, at action block 432, the difference between the Health Stage and the actual fault level is calculated as the modeling error.

Action blocks 431 and 432 may be repeated for all Health Indicators to find the corresponding Health Stage and error.

Calibration process 430 further includes, at action block 433, ranking the Health Stages (corresponding Health Indicators) based on criteria such as the modeling error, monotonicity, linearity, receiver operating characteristic (ROC), robustness, and the like.

Calibration process 430 continues at action block 434 with selecting which Health Stages (corresponding to which Health Indicators) to fuse. For example, method 400 may use a forward selection method to determine which Health Stages will be fused.

Also, calibration process 430 includes, at action block 435, determining a pre-determined weight to each selected Health Stage for fusing. For example, the inverse of the modeling error, i.e., (1/modeling error), for each Health Stage may be applied as the pre-determined weight. Thus, a Health Stage with a smaller modeling error is provided with a larger weight, and a Health Stage with a larger modeling error is provided with a smaller weight.

The outputs of the calibration process 430 include the HI-HS model, a list of HS to fuse, and a pre-defined weight of each HS, i.e., 1/modeling error. As shown, these outputs of the calibration process 430 are stored at action block 440 of method 400 and may be used as pre-defined parameters for the algorithm of method 400.

Thus, after calculating the health indicators at action block 452, method 400 may continue at action block 456 with applying the pre-defined regression model, stored as a calibration output, to health indicators (HIs) to find Health Stages (HSs).

At action block 457, method 400 may continue with applying the pre-determined weight, stored as a calibration process output, to each selected Health Stage for fusing.

Method 400 continues at action block 458 with summing the weighted Health Stages to provide a fused Health Stage (i.e., estimated fault level) per segment for the selected bearing.

Further, method 400 may include, at action block 459, averaging the Health Stages across segments to yield a matured Health Stage. Maturation size (i.e., how many buffers/segments used for averaging) can be determined based on the need. The larger the number of buffers, the more mature decision; however, the larger time to detection as well.

At action block 461, method 400 includes applying pre-defined thresholds on the fused Health Stage to detect the state of health, i.e., healthy or faulty, of the selected bearing at the selected location. For example, when the fused Health Stage is greater than the threshold, then the selected bearing is classified as faulty at the selected location, and when the fused Health Stage is less than the threshold, then the selected bearing is classified as healthy at the selected location.

The threshold values may be determined through empirical testing and validation. A threshold that is set too high can result in false negatives, while a threshold that is set too low can result in false positives.

Method 400 may then be repeated from action block 451 with the selection of another location on the selected bearing for analysis to the application of predefined thresholds on the fused Health Stage at action block 461 to detect the state of health, i.e., healthy or faulty, of the next location of the selected bearing.

After all locations of the selected bearing have been analyzed, method 400 may be repeated from action block 450 with the selection of a next bearing for analysis at each location on the next bearing.

Thus, in summary action blocks 450 through 461 may be repeated to determine which bearing(s) is faulty and to determine the location(s) of the fault(s) (inner race, outer race, etc.) in the faulty bearing(s). The critical frequencies of different locations (inner race (BPFI), outer race, etc.) are different. Critical frequencies of different bearings are also different (depending on the bearing geometry). So, for each bearing, action blocks 451 through 461 are repeated for its critical frequencies (various locations), As a result, the method 400 determines if a bearing is health of faulty in a State of Health (SOH) determination and estimates the fault level in a Health Stage (HS) determination, for each location for each bearing. Then, the process is iterated over all bearings inside the drive unit to isolate the fault, i.e., which bearing, and to identify the location, i.e., where in the bearing. In case of a fault detection, an output or warning message regarding the detection and isolation of the fault is communicated.

Further, method 400 may be considered to detect that a fault is present (i.e., state of health), estimate the fault level (i.e., health stage), isolate the detected fault (such as to the specific bearing, and locate the identified fault (such as to the specific part of the bearing).

Method 400 may further include, at action block 470, communicating an output to a user. The output may indicate the state of health and health stage (faulty or healthy) for each location in each bearing. Alternatively, the output may only report faulty bearings and the location of the faults on the faulty bearing, as well as the fault level (Health Stage).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for health monitoring a drive unit bearing in a vehicle, the system comprising:
    a sensor mounted to a drive unit of the vehicle and configured to provide a vibration signal;
    a motor speed sensor for sensing motor speed and/or a torque sensor for sensing torque; and
    a processor configured to:
        determine whether the motor speed is in a speed range and/or to determine whether the torque is in a torque range suitable for monitoring the drive unit bearing;
        pre-process the vibration signal from the sensor to enhance a fault signature and form a frequency domain signal; and
        process the frequency domain signal to estimate a health stage of the drive unit bearing.

2. The system of claim 1, wherein the processor is configured to process the frequency domain signal to extract and fuse health indicators, and estimate a fault level and a fault location from the health indicators.

3. The system of claim 1, wherein the processor is configured to process the frequency domain signal to detect whether a bearing is healthy or faulty.

4. The system of claim 1, wherein the processor is configured to process the frequency domain signal to isolate a fault in a particular bearing and to determine a location of the fault on the particular bearing.

5. The system of claim 1, wherein the processor is configured to pre-process the vibration signal from the sensor by performing a phase domain transformation, a discrete frequency removal, an impulsiveness enhancement, an envelope filter, and a short time Fourier transformation (STFT).

6. The system of claim 1, wherein the processor is configured to process the frequency domain signal by:
    calculating health indicators;
    applying a regression model to the health indicators to find health stages; and
    comparing the health stages with predefined thresholds to detect a state of health of the drive unit bearing.

7. The system of claim 1, wherein the processor is configured to perform a calibration process comprising:
    fitting a regression model to health indicators to find health stages;
    calculating a modeling error;
    ranking the health stages;
    selecting specific health stages to fuse; and
    determining pre-defined weights for the health stages, and wherein outputs from the calibration process are stored in the system.

8. The system of claim 7, wherein the processor is configured to:
    calculate health indicators;
    apply the pre-defined weights to generate weighted health stages;
    sum the weighted health stages to provide a fused health stage; and
    compare the fused health stage with a predefined threshold to detect a state of health of the drive unit bearing.

9. The system of claim 1, wherein the processor is further configured to communicate an output indicating the health stage of the drive unit bearing.

10. A method for monitoring health of a drive unit bearing in a vehicle, the method comprising:
    performing a calibration process comprising:
        fitting a regression model to health indicators to find health stages;
        calculating a modeling error;
        ranking the health stages;
        selecting specific health stages to fuse;
        determining pre-defined weights for the health stages; and
        storing outputs from the calibration process;
    sensing vibrations with a sensor at a known location relative to a drive unit and providing sensor data;
    performing a short time Fourier transform (STFT) to form spectrum signals over a plurality of segments;
    calculating health indicators of the drive unit bearing based on the spectrum signals and on critical frequencies of the drive unit bearing; and
    determining a health stage of the drive unit bearing based on each health indicator.

11. The method of claim 10, wherein determining the health stage of the drive unit bearing based on each health indicator comprises applying a regression model to each of the health indicators.

12. The method of claim 10, further comprising detecting a state of health of the drive unit bearing based on the health stage.

13. The method of claim 10, further comprising
    sensing motor speed with a motor sensor and/or sensing torque with a torque sensor; and
    determining whether the motor speed is in a speed range and/or determining whether the torque is in a torque range suitable for monitoring the drive unit bearing.

14. The method of claim 10, further comprising applying the pre-defined weights to the calculated health indicators to generate weighted health stages.

15. The method of claim 14, further comprising calculating a fused health stage from the weighted health stages.

16. The method of claim 15, further comprising comparing the fused health stage with a predefined threshold to detect a state of health of the drive unit bearing.

17. The method of claim 10, further comprising communicating an output indicating the health stage of the drive unit bearing.

18. The method of claim 10, wherein the drive unit bearing is a first drive unit bearing, and wherein the method further comprises monitoring health of a second drive unit bearing.

19. A vehicle comprising:
a drive unit bearing;
a vibration sensor configured to provide sensor data; and
a processor or processors individually or collectively configured to:
    perform a calibration process comprising:
        fitting a regression model to health indicators to find health stages;
        calculating a modeling error;
        ranking the health stages;
        selecting specific health stages to fuse; and
        determining pre-defined weights for the health stages, and wherein outputs from the calibration process are stored in the system;
    pre-process the sensor data to generate a spectrum; and
    process the spectrum to estimate health stages of the drive unit bearing.

20. The vehicle of claim 19, further comprising a motor speed sensor for sensing motor speed and/or a torque sensor for sensing torque, wherein the processor is configured to determine whether the motor speed is in a speed range and/or to determine whether the torque is in a torque range suitable for monitoring the drive unit bearing.

* * * * *